US012058507B2

(12) United States Patent
Yang

(10) Patent No.: US 12,058,507 B2
(45) Date of Patent: Aug. 6, 2024

(54) SOUND OUTPUT EQUIPMENT AND DISPLAY DEVICE

(71) Applicant: LG ELECTRONICS INC., Seoul (KR)

(72) Inventor: Sungeun Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 17/841,602

(22) Filed: Jun. 15, 2022

(65) Prior Publication Data

US 2023/0094106 A1 Mar. 30, 2023

(30) Foreign Application Priority Data

Sep. 27, 2021 (KR) ........................ 10-2021-0127361

(51) Int. Cl.

*H04R 1/02* (2006.01)
*H04R 1/28* (2006.01)
*H04R 7/12* (2006.01)
*H04R 7/18* (2006.01)
*H04R 9/02* (2006.01)
*H04R 9/04* (2006.01)
*H04R 9/06* (2006.01)

(52) U.S. Cl.

CPC ............... *H04R 9/06* (2013.01); *H04R 1/028* (2013.01); *H04R 1/2811* (2013.01); *H04R 1/2896* (2013.01); *H04R 7/12* (2013.01); *H04R 7/18* (2013.01); *H04R 9/025* (2013.01); *H04R 9/041* (2013.01); *H04R 2400/11* (2013.01); *H04R 2499/15* (2013.01)

(58) Field of Classification Search

CPC ........ H04R 9/06; H04R 1/028; H04R 1/2811; H04R 1/2896; H04R 7/12; H04R 7/18; H04R 9/025; H04R 9/041; H04R 2400/11; H04R 2499/15
USPC .................................................. 381/333, 334
See application file for complete search history.

(56) References Cited

U.S. PATENT DOCUMENTS 6,735,322 B1 * 5/2004 Watanabe ............. H04R 9/041 381/404
2010/0172520 A1 7/2010 Shimokawatoko et al.

FOREIGN PATENT DOCUMENTS

| | | | | |
|---|---|---|---|---|
| JP | 2001086589 | | 3/2001 | |
| KR | 1201828 B1 | * | 11/2012 | ............. H04R 9/046 |
| KR | 101201828 | | 11/2012 | |
| KR | 1020200031033 | | 3/2020 | |
| KR | 20210048345 A | * | 5/2021 | ........... H04R 1/2834 |
| KR | 1020210048345 | | 5/2021 | |

OTHER PUBLICATIONS

PCT International Application No. PCT/KR2021/013304, Written Opinion and International Search Report dated Jun. 24, 2022, 10 pages.

* cited by examiner

*Primary Examiner* — Ammar T Hamid
(74) *Attorney, Agent, or Firm* — LEE, HONG, DEGERMAN, KANG & WAIMEY

(57) ABSTRACT

Disclosed are sound output equipment that exhibits high efficiency while having a slim structure and a display device including the same.

10 Claims, 11 Drawing Sheets

SOUND OUTPUT EQUIPMENT AND DISPLAY DEVICE

CROSS-REFERENCE TO RELATED APPLICATION(S)

Pursuant to 35 U.S.C. § 119(a), this application claims the benefit of earlier filing date and right of priority to Korean Patent Application No. 10-2021-0127361, filed on Sep. 27, 2021, the contents of which are hereby incorporated by reference herein in its entirety.

BACKGROUND

Field

The present disclosure relates to sound output equipment that exhibits high efficiency while having a slim structure and a display device including the same.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

In recent years, a display device has been thinned as the result of thinning of a display module, whereby parts mounted in the display device have been miniaturized.

In particular, a sound output unit requires a space of a predetermined size in a vertical direction, since a sound is output through upward-downward movement of a diaphragm, and therefore it is difficult to slim the sound output unit.

In addition, strong magnetic force is necessary to obtain sufficient output of sound output equipment, and a magnet mounting space for strong magnetic force becomes a problem.

SUMMARY

The present disclosure is to address at least the above-mentioned problems and/or disadvantages and to provide at least the advantages described below. Accordingly, an aspect of the present disclosure is to provide sound output equipment mounted in a display device having a slim design and a display device including the same.

Additional aspects will be set forth in part in the description which follows and, in part, will be apparent from the description, or may be learned by practice of the presented embodiments of the disclosure.

According to the present disclosure, a sound output equipment includes a base plate made of a metal material, an inner magnetic portion located at a center of the base plate, a voice coil located around the inner magnetic portion, a plurality of outer magnetic portions located around the voice coil, an upper cover located above the inner magnetic portion, the voice coil, and the outer magnetic portions, a circular diaphragm located around the outer magnetic portions, and a bridge extending between the plurality of outer magnetic portions, the bridge being configured to connect the diaphragm and the voice coil to each other, wherein the inner magnetic portion includes a first inner magnet, an inner plate located at an upper surface of the first inner magnet, and a second inner magnet located at an upper surface of the inner plate, and the outer magnetic portion includes a plurality of first outer magnets located at an outer circumference of the voice coil, an outer plate located at upper surfaces of the first outer magnets, and a second outer magnet located at an upper surface of the outer plate.

The upper cover may include a metal material, and may contact upper surfaces of the second inner magnet and the second outer magnet.

The upper cover may further include an edge portion protruding toward the second outer magnet.

The voice coil may be disposed such that a center of the voice coil in a vertical direction and a center of the inner plate in the vertical direction are located in an identical plane.

The second inner magnet may have a thickness corresponding to the thickness of the first inner magnet.

The sound output equipment may further include a frame located around and above the diaphragm and a guide located between the frame and the upper cover, wherein the diaphragm may include an outer edge connected to the frame and an inner edge connected to the guide.

The sound output equipment may further include a resonance hole located in a lateral direction of the frame and an enclosure communicating with the resonance hole, the enclosure being configured to form a resonance space.

The sound output equipment may further include a damper configured to connect the bridge and the frame to each other, the damper being elastic.

The bridge may correspond in number to the outer magnetic portion.

According to the present disclosure, a display device includes a housing, a display module located at a front surface of the housing, and a slim speaker located in a rear direction of the display module, wherein the slim speaker includes a base plate made of a metal material, an inner magnetic portion located at a center of the base plate, a voice coil located around the inner magnetic portion, a plurality of outer magnetic portions located around the voice coil, an upper cover located above the inner magnetic portion, the voice coil, and the outer magnetic portions, a circular diaphragm located around the outer magnetic portions, and a bridge extending between the plurality of outer magnetic portions, the bridge being configured to connect the diaphragm and the voice coil to each other, the inner magnetic portion includes a first inner magnet, an inner plate located at an upper surface of the first inner magnet, and a second inner magnet located at an upper surface of the inner plate, and the outer magnetic portion includes a plurality of first outer magnets located at an outer circumference of the voice coil, an outer plate located at upper surfaces of the first outer magnets, and a second outer magnet located at an upper surface of the outer plate.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
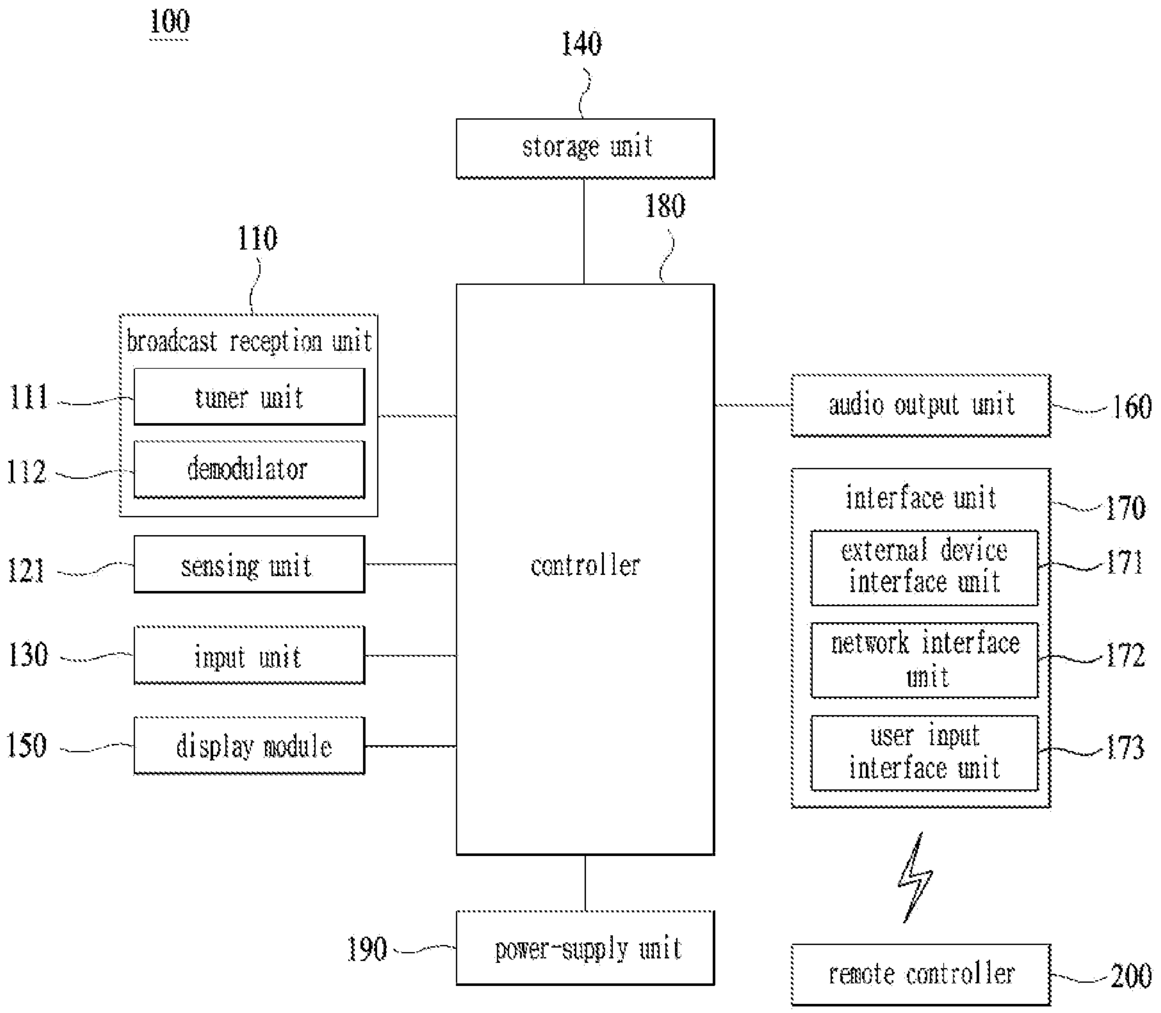
FIG. 1 is a block diagram illustrating components of a display device according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a block diagram illustrating components of a display device 100. The display device 100 may include a broadcast reception unit 110, an external device interface unit 171, a network interface unit 172, a storage unit 140, a user input interface unit 173, an input unit 130, a controller 180, a display module 150, an audio output unit 160, and/or a power supply unit 190.

The broadcast reception unit 110 may include a tuner unit 111 and a demodulation unit 112.

Unlike the figure, on the other hand, the display device 100 may include only the external device interface unit 171 and the network interface unit 172, among the broadcast reception unit 110, the external device interface unit 171, and the network interface unit 172. That is, the display device 100 may not include the broadcast reception unit 110.

The tuner unit 111 may select a broadcast signal corresponding to a channel selected by a user or any one of all pre-stored channels, among broadcast signals received through an antenna (not shown) or a cable (not shown). The tuner unit 111 may convert the selected broadcast signal into an intermediate frequency signal or a baseband video or audio signal.

For example, when the selected broadcast signal is a digital broadcast signal, the tuner unit 111 may convert the broadcast signal into a digital IF (DIF) signal, and when the selected broadcast signal is an analog broadcast signal, the tuner unit 111 may convert the broadcast signal into an analog baseband video or audio (CVBS/SIF) signal. That is, the tuner unit 111 may process the digital broadcast signal or the analog broadcast signal. The analog baseband video or audio (CVBS/SIF) signal output from the tuner unit 111 may be directly input to the controller 180.

Meanwhile, the tuner unit 111 may sequentially select broadcast signals of all broadcast channels stored through a channel memory function, among received broadcast signals, and may convert each of the selected broadcast signals into an intermediate frequency signal or a baseband video or audio signal.

Meanwhile, the tuner unit 111 may include a plurality of tuners in order to receive broadcast signals of a plurality of channels. Alternatively, a single tuner may simultaneously receive broadcast signals of a plurality of channels.

The demodulation unit 112 may receive the digital IF (DIF) signal converted by the tuner unit 111, and may perform demodulation. After performing demodulation and channel decryption, the demodulation unit 112 may output a stream signal (TS). At this time, the stream signal may be a multiplexed image, audio, or data signal.

The stream signal output from the demodulation unit 112 may be input to the controller 180. After performing demultiplexing and image/audio signal processing, the controller 180 may output an image through the display module 150, and may output audio through the audio output unit 160.

The sensing unit 120 is a device configured to sense change inside or outside the display device 100. For example, the sensing unit 120 may include at least one of a proximity sensor, an illumination sensor, a touch sensor, an infrared (IR) sensor, an ultrasonic sensor, an optical sensor (e.g. a camera), an audio sensor (e.g. a microphone), a battery gauge, and an environmental sensor (e.g. a hygrometer or a thermometer).

The controller 180 may check the state of the display device 100 based on information collected by the sensing unit, and when a problem occurs, may inform a user of the same or may solve the problem, whereby the controller may perform control such that the display device is maintained in the best state.

In addition, the controller may differently control the content, quality, and size of an image provided to the display module 150 based on a viewer or ambient light sensed by the sensing unit in order to provide the optimum viewing environment. With progress of a smart TV, a large number of functions have been loaded in the display device, and the sensing unit 20 has also been increased in number.

The input unit 130 may be provided at one side of a main body of the display device 100. For example, the input unit 130 may include a touchpad or a physical button. The input unit 130 may receive various user commands related to the operation of the display device 100, and may transmit control signals corresponding to the received commands to the controller 180.

With a decrease in size of a bezel of the display device 100, many display devices 100 have been configured such that the number of physical button type input units 130 exposed to the outside is minimized in recent years. Instead, a minimum number of physical buttons is located at the rear surface or the side surface of the display device, and the display device may receive user input through the touchpad or the user input interface unit 173, a description of which will follow, using a remote controller 200.

The storage unit 140 may store programs for signal processing and control in the controller 180, and may store a processed image, audio, or data signal. For example, the storage unit 140 may store application programs designed to execute various tasks that can be processed by the controller 180, and may selectively provide some of the stored application programs in response to request of the controller 180.

Programs stored in the storage unit 140 are not particularly restricted as long as the programs can be executed by the controller 180. The storage unit 140 may temporarily store an image, audio, or data signal received from an external device through the external device interface unit 171. The storage unit 140 may store information about a predetermined broadcast channel through a channel memory function, such as a channel map.

FIG. 1 shows an embodiment in which the storage unit 140 and the controller 180 are separately provided; however, the present disclosure is not limited thereto. The storage unit 140 may be included in the controller 180.

The storage unit 140 may include at least one of a volatile memory (e.g. DRAM, SRAM, or SDRAM), a nonvolatile memory (e.g. flash memory), a hard disk drive (HDD), and a solid-state drive (SSD).

The display module 150 may convert an image signal, a data signal, an OSD signal, and a control signal processed by the controller 180 or an image signal, a data signal, and a control signal received from the interface unit 171 to generate a driving signal. The display module 150 may include a display panel 181 having a plurality of pixels.

Each of the plurality of pixels in the display panel may include RGB subpixels. Alternatively, each of the plurality of pixels in the display panel may include RGBW subpixels. The display module 150 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 150, and a 3D display may also be used. The 3D display 130 may be classified as a non-glasses type display or a glasses type display.

Meanwhile, the display module 150 may be constituted by a touchscreen, whereby an input device may also be used in addition to an output device.

The audio output unit 160 receives an audio signal processed by the controller 180 and outputs the same as audio.

The interface unit 170 serves as a path to various kinds of external devices connected to the display device 100. The interface unit may include a wireless system using an antenna as well as a wired system configured to transmit and receive data through a cable.

The interface unit 170 may include at least one of a wired/wireless headset port, an external charger port, a wired/wireless data port, a memory card port, a port for connection with a device having an identification module, an audio input/output (I/O) port, a video input/output (I/O) port, and an earphone port.

The broadcast reception unit 110 may be included as an example of the wireless system, and a mobile communication signal, a short-range communication signal, and a wireless Internet signal as well as a broadcast signal may be included.

The external device interface unit 171 may transmit or receive data to or from a connected external device. To this end, the external device interface unit 171 may include an A/V input and output unit (not shown).

The external device interface unit 171 may be connected to an external device, such as a digital versatile disc (DVD) player, a Blu-ray player, a game console, a camera, a camcorder, a computer (laptop computer), or a set-top box, in wired/wireless manner, and may perform input/output operation for the external device.

In addition, the external device interface unit 171 may establish a communication network with various remote controllers 200 in order to receive a control signal related to the operation of the display device 100 from each remote controller 200 or to transmit data related to the operation of the display device 100 to each remote controller 200.

The external device interface unit 171 may include a wireless communication unit (not shown) for short-range wireless communication with another electronic device. The external device interface unit 171 may exchange data with a mobile terminal adjacent thereto through the wireless communication unit (not shown). Particularly, in a mirroring mode, the external device interface unit 171 may receive device information, information of an application that is executed, and an image of the application from the mobile terminal.

The network interface unit 172 may provide an interface for connection of the display device 100 with a wired/wireless network including the Internet. For example, the network interface unit 172 may receive content or data provided by an Internet or content provider or a network operator through the network. Meanwhile, the network interface unit 172 may include a communication module (not shown) for connection with the wired/wireless network.

The external device interface unit 171 and/or the network interface unit 172 may include a communication module for short-range communication, such as Wi-Fi, Bluetooth, Bluetooth Low Energy (BLE), ZigBee, or Near Field Communication (NFC), or a communication module for cellular communication, such as Long-Term Evolution (LTE), LTE Advance (LTE-A), Code Division Multiple Access (CDMA), Wideband CDMA (WCDMA), Universal Mobile Telecommunications System (UMTS), or Wireless Broadband (WiBro).

The user input interface unit 173 may transmit a user input signal to the controller 180, or may transmit a signal from the controller 180 to a user. For example, the user input interface unit may transmit/receive a user input signal, such as power on/off, channel selection, or screen setting, to/from the remote controller 200, may transmit a user input signal, such as a power key, a channel key, a volume key, or a setting value, input from a local key (not shown) to the controller 180, may transmit a user input signal input from a sensor unit (not shown) configured to sense user gesture to the controller 180, or may transmit a signal from the controller 180 to the sensor unit.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit 111, the demodulation unit 112, the external device interface unit 171, or the network interface unit 172, or may process demultiplexed signals to generate and output a signal for image or audio output.

An image signal processed by the controller 180 may be input to the display module 150, which may display an image corresponding to the image signal. In addition, the image signal processed by the controller 180 may be input to an external output device through the external device interface unit 171.

An audio signal processed by the controller 180 may be output through the audio output unit 160. In addition, the audio signal processed by the controller 180 may be input to an external output device through the external device interface unit 171. Although not shown in FIG. 2, the controller 180 may include a demultiplexing unit and an image processing unit, which will be described below with reference to FIG. 3.

Further, the controller 180 may control the overall operation of the display device 100. For example, the controller 180 may control the tuner unit 111 such that a broadcast corresponding to a channel selected by a user or a pre-stored channel is tuned.

In addition, the controller 180 may control the display device 100 according to a user command input through the user input interface unit 173 or an internal program. Meanwhile, the controller 180 may control the display module 150 to display an image. At this time, the image displayed on the display module 150 may be a still image or video, or may be a 2D image or a 3D image.

Meanwhile, the controller 180 may perform control such that a predetermined 2D object is displayed in an image displayed on the display module 150. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera; however, the present disclosure is not limited thereto. The photographing unit may be implemented by a plurality of cameras. Meanwhile, the photographing unit may be embedded in the display device 100 above the display module 150, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 150 corresponding to the location of the user.

The controller 180 may sense user gesture based on the image captured by the photographing unit, a signal sensed by the sensor unit, or a combination thereof.

The power supply unit 190 may supply power to the components of the display device 100. In particular, the power supply unit may supply power to the controller 180, which may be implemented in the form of a system on chip (SOC), the display module 150 for image display, and the audio output unit 160 for audio output.

Specifically, the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

In the former case, a cable is used, and the power supply unit is difficult to move or the movement range of the power supply unit is limited. In the latter case, the power supply unit is free to move, but the weight of the power supply unit is increased in proportion to the weight of the battery, the volume of the power supply unit is increased, and, for charging, the power supply unit must be directly connected to a power cable or must be coupled to a charging holder (not shown) that supplies power for a predetermined time.

The charging holder may be connected to the display device through a terminal exposed to the outside, or the battery mounted in the power supply unit may be charged in a wireless manner when the power supply unit approaches the charging holder.

The remote controller 200 may transmit user input to the user input interface unit 173. To this end, the remote controller 200 may use Bluetooth communication, radio frequency (RF) communication, infrared radiation communication, ultra-wideband (UWB) communication, or ZigBee communication. In addition, the remote controller 200 may receive an image, audio, or data signal output from the user input interface unit 173 so as to be displayed thereon or audibly output therefrom.

Meanwhile, the display device 100 may be a stationary or movable digital broadcast receiver capable of receiving a digital broadcast.

Meanwhile, the block diagram of the display device 100 shown in FIG. 1 is for an embodiment of the present disclosure, and elements of the block diagram may be integrated, added, or omitted depending on specifications of an actually implemented display device 100.

That is, two or more elements may be integrated into one element, or one element may be divided into two or more elements, as needed. In addition, the function performed by each block is for describing the embodiment of the present disclosure, and the specific operations and components thereof do not limit the scope of rights of the present disclosure.

Figure 2:
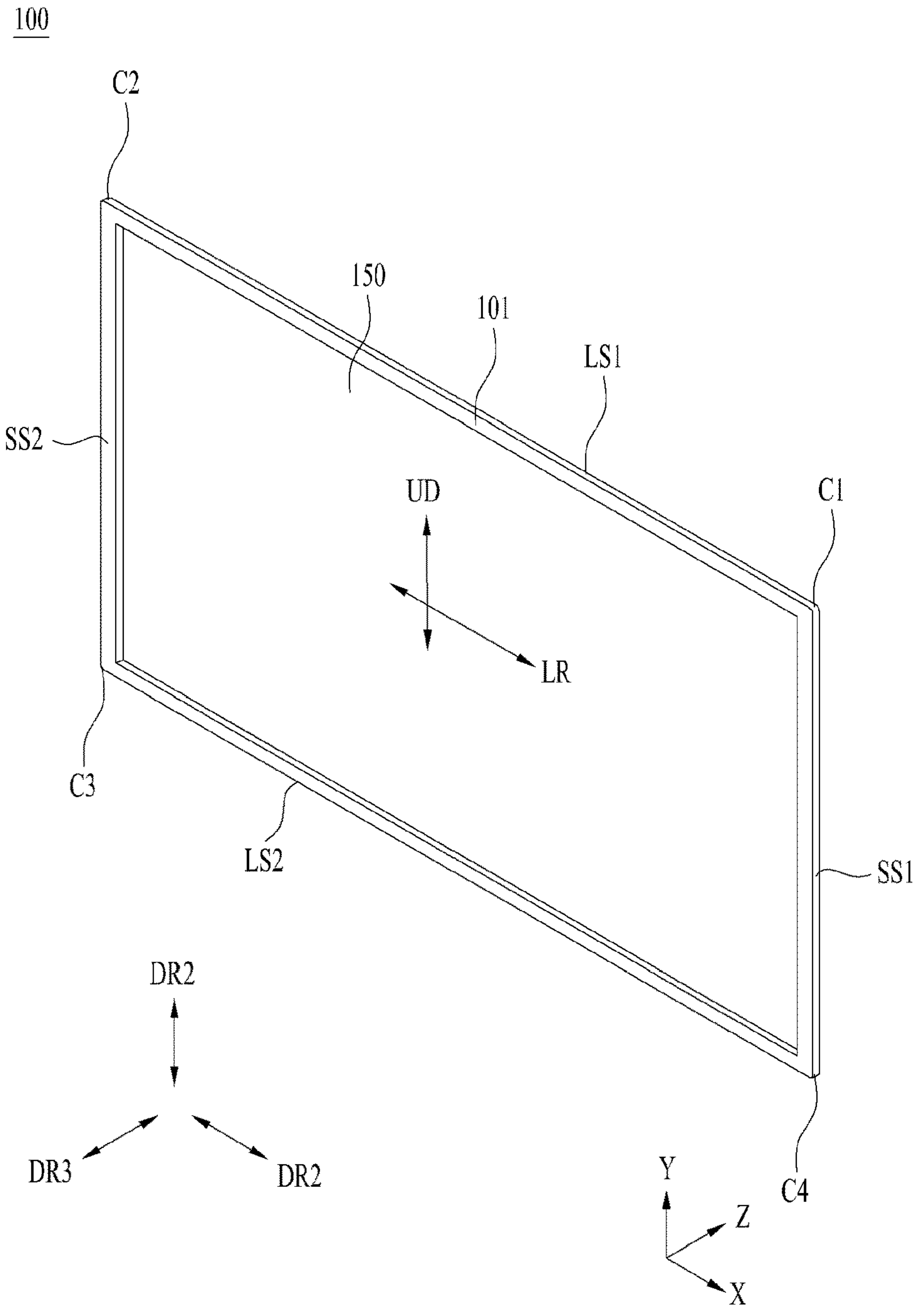
FIG. 2 is a perspective view showing an example of the display device according to the present disclosure.

FIG. 2 is a front perspective view showing an example of the display device.

Referring to FIG. 2, the display device 100 may have a rectangular shape including a first long side LS1, a second long side LS2 opposite the first long side LS1, a first short side SS1 adjacent to the first long side LS1 and the second long side LS2, and a second short side SS2 opposite the first short side SS1.

Here, the area of the first short side SS1 may be referred to as a first side area, the area of the second short side SS2 may be referred to as a second side area opposite the first side area, the area of the first long side LS1 may be referred to as a third side area adjacent to the first side area and the second side area and located between the first side area and the second side area, and the area of the second long side LS2 may be referred to as a fourth side area adjacent to the first side area and the second side area, located between the first side area and the second side area, and opposite the third side area.

In addition, the lengths of the first and second long sides LS1 and LS2 are shown and described as being greater than the lengths of the first and second short sides SS1 and SS2, for convenience of description; however, the lengths of the first and second long sides LS1 and LS2 may be approximately equal to the lengths of the first and second short sides SS1 and SS2.

Also, in the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

From a different point of view, the side of the display device 100 on which a picture is displayed may be referred to as a front side or a front surface. When the display device 100 displays the picture, the side of the display device 100 from which the picture cannot be viewed may be referred to as a rear side or a rear surface. When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

In addition, the first long side LS1, the second long side LS2, the first short side SS1, and the second short side SS2 may be referred to edges 351 of the display device 100. In addition, points at which the first long side LS1, the second long side LS2, the first short side SS1, and the second short side SS2 are joined to each other may be referred to as corners. For example, a point at which the first long side LS1 and the first short side SS1 are joined to each other may be a first corner C1, a point at which the first long side LS1 and the second short side SS2 are joined to each other may be a second corner C2, a point at which the second short side SS2 and the second long side LS2 are joined to each other may be a third corner C3, and a point at which the second long side LS2 and the first short side SS1 are joined to each other may be a fourth corner C4.

Here, a direction from the first short side SS1 to the second short side SS2 or a direction from the second short side SS2 to the first short side SS1 may be referred to as a leftward-rightward direction LR. A direction from the first long side LS1 to the second long side LS2 or a direction from the second long side LS2 to the first long side LS1 may be referred to as a vertical direction UD.

The display device includes a display module, which occupies a major portion of the front surface thereof, and a case configured to cover the rear surface and the side surface of the display module, the case being configured to package the display module.

In recent years, the display device 100 has used a flexible display module 150, such as light-emitting diodes (LED) or organic light-emitting diodes (OLED), in order to implement a curved screen.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 150 using the LED or the OLED.

An organic light-emitting diode (OLED) panel appeared in earnest in mid 2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module includes a display panel and a coupling magnet, a first power supply unit, and a first signal module located at a rear surface of the display panel. The display panel may include a plurality of pixels R, G, and B. The plurality of pixels R, G, and B may be formed at intersections between a plurality of data lines and a plurality of gate lines. The plurality of pixels R, G, and B may be disposed or arranged in a matrix form.

For example, the plurality of pixels R, G, and B may include a red subpixel 'R', a green subpixel 'G', and a blue subpixel 'B'. The plurality of pixels R, G, and B may include a white subpixel 'W'.

The side of the display module 150 on which a picture is displayed may be referred to as a front side or a front surface. When the display module 150 displays the picture, the side of the display module 150 from which the picture cannot be viewed may be referred to as a rear side or a rear surface.

Figure 3:
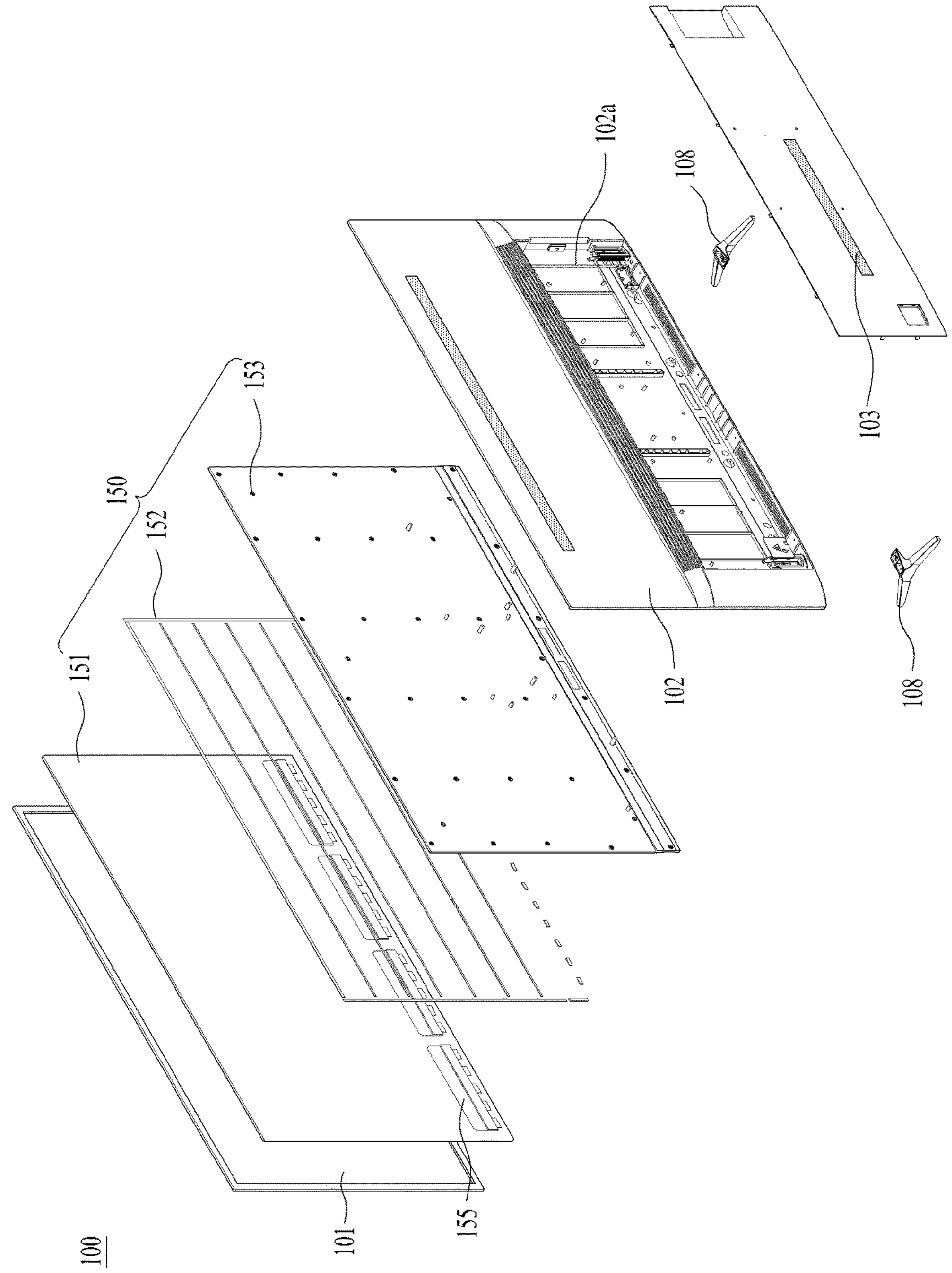
FIG. 3 is an exploded perspective view showing the example of the display device according to the present disclosure.

FIG. 3 is an exploded view of the display device 100. The display device 100 may include a display module 150, a case top 101 configured to wrap the circumference of a side surface of the display module 150 while covering the circumference of the front surface of the display module 150, a cover bottom 102 configured to cover the rear surface of the display module 150, and a back cover 103 coupled to a rear surface **102*a* of the cover bottom 102, the back cover being configured to cover parts mounted in the rear surface of the cover bottom 102**.

In recent years, the display module 150 has been thinned, whereby a housing 101 and 102 has also been thinned, and therefore the case top 101 constituting a bezel located at the circumference of the front surface of the display module 150 may be thinned or omitted. For example, for the OLED panel, the backlight unit is omitted and a layered structure exposed in a lateral direction is simpler than for the liquid crystal panel, whereby the case top 101 may be omitted.

The display module may include a display panel 151 configured to output an image and a support panel 153 configured to support a rear surface of the display panel, and the two members may be coupled to each other using an adhesive member 152, such as OCA.

A flexible substrate extending from an end of the display panel 151 may be bent in a rearward direction so as to be connected to a control substrate mounted in the cover bottom 102. When a liquid crystal panel is used, a light source substrate, an optical sheet, and the liquid crystal panel may be disposed in that order using a panel guide to constitute the display panel 151.

A wall-mounted type display device 100 may include a wall fastening structure (not shown) provided at the rear surface thereof, and a stand type display device 100 may include a stand 108 extending downwards from the display module 150.

Figure 4:
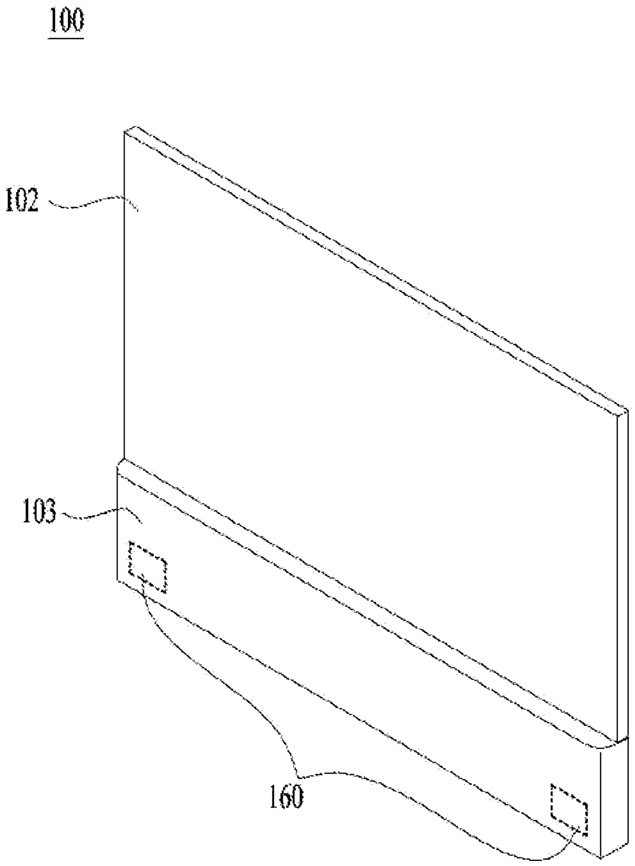
FIG. 4 is a rear perspective view showing the example of the display device according to the present disclosure.

FIG. 4 is a rear perspective view showing the example of the display device 100 according to the present disclosure. As the thickness of the display module 150 has been decreased, the entirety of the display device 100 has been slimmed, whereby parts located at the rear surface of the display module 150 have also been slimmed.

Among the parts mounted in the rear surface of the display module 150, a part the size of which is difficult to reduce is a speaker as sound output equipment 300. Since the sound output equipment 300 outputs a sound through vibration of a diaphragm 350, the magnitude of vibration of the diaphragm 350 must be large in order to output a sound having a predetermined magnitude or more, and a space having a sufficient size not to interfere with vibration of the diaphragm 350 is necessary.

Since a slim display device 100 has a limited mounting space, the sound output equipment 300 is omitted, or sound output equipment 300 having low performance is mounted. In order to reinforce an insufficient sound, therefore, a separate sound bar or a home theater system is required. If a separate sound output unit is provided, additional cost is incurred, and an installation space therefor is necessary.

Therefore, there is a need for sound output equipment 300 having improved performance while being slimmed so as to be mounted in a slim display device 100.

Figure 5:
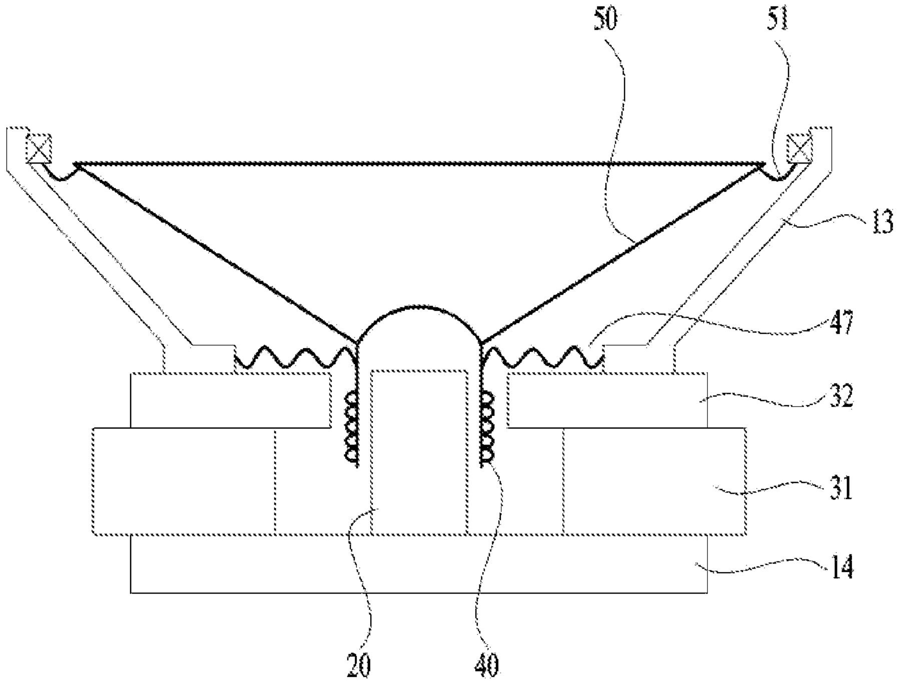
FIG. 5 is a view showing conventional sound output equipment.

FIG. 5 is a view showing conventional sound output equipment. The sound output equipment shown in FIG. 5 includes a frame 13, a magnet 31 provided in the frame 13, a base plate 14 located under the magnet 31, and an upper plate 32 located on the magnet, and a pole 20.

A voice coil 40 located inside the magnet is wound into a circle. The voice coil 40 is coupled to the frame 13 so as to be vibrated upwards and downwards by an elastic damper 47. The voice coil 40 is coupled to a diaphragm 50 located at an upper side, and the elastic diaphragm 50 includes an edge 51 fixed to the frame 13.

Magnetic force is generated between the upper plate 32 and the pole 20 by the magnet. When current is supplied to the voice coil 40, the diaphragm 50 is vibrated upwards and downwards by Lorentz force, whereby sound is transmitted to the outside.

The conventional speaker has a thickness corresponding to the sum of the height of the diaphragm 50 and the thicknesses of the upper plate 32, the base plate 14, and the magnet, whereby the overall thickness of the speaker is increased.

In order to reduce the overall thickness of the speaker, attempts have been made to reduce the thicknesses of the upper plate 32, the base plate 14, and the magnet. If the thicknesses thereof are reduced, however, intensity of magnetic force is weakened, whereby output is reduced and sound quality is lowered.

The vertical amplitude range of the voice coil 40 is narrowed due to interference with the upper plate 32. As a result, the amplitude of the diaphragm 50 is also narrowed, whereby there is a limitation in increasing output thereof to a predetermined magnitude or more.

Figure 6:
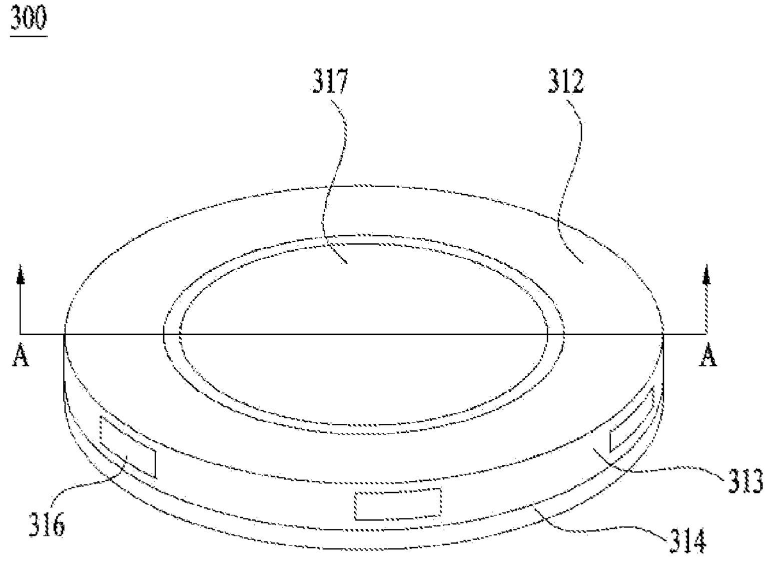
FIG. 6 is a perspective view showing sound output equipment according to the present disclosure.
Figure 7:
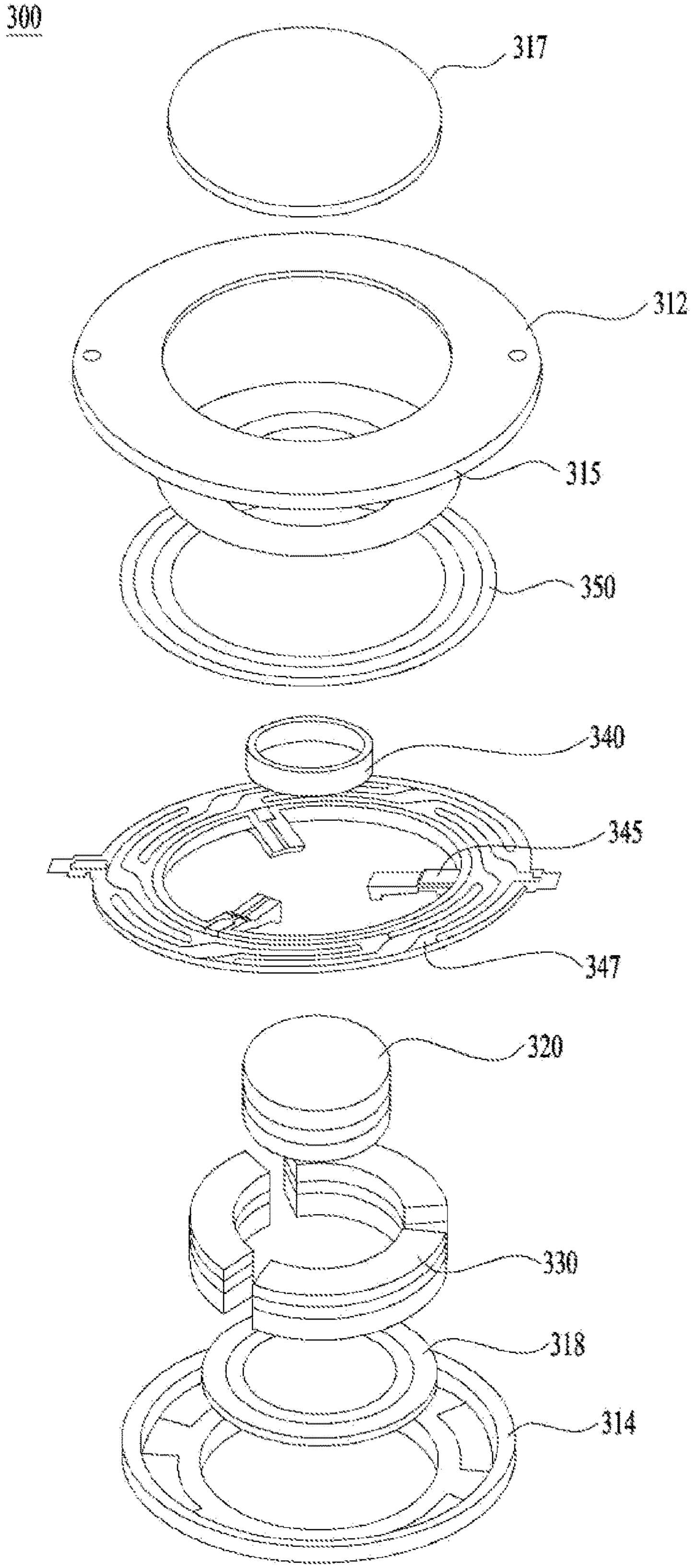
FIG. 7 is an exploded perspective view showing the sound output equipment according to the present disclosure.

FIG. 6 is a perspective view showing sound output equipment 300 according to the present disclosure, and FIG. 7 is an exploded perspective view showing the sound output equipment 300 according to the present disclosure. In the figures, the sound output equipment 300 according to the present disclosure shown in FIGS. 6 and 7 is slim in a vertical direction, compared to the sound output equipment of FIG. 5.

In the figures, the sound output equipment is shown as being circular; however, the sound output equipment may be oval or rectangular.

The sound output equipment 300 according to the present embodiment may include a base plate 318, an inner magnetic portion 320, an outer magnetic portion 330, a voice coil 340, a bridge 345, a damper 347, a diaphragm 350, a frame 310, and a cover. The frame 310, which is a housing of the sound output equipment 300, may include an upper frame 312, a side frame 310, and a lower frame 314.

Figure 8:
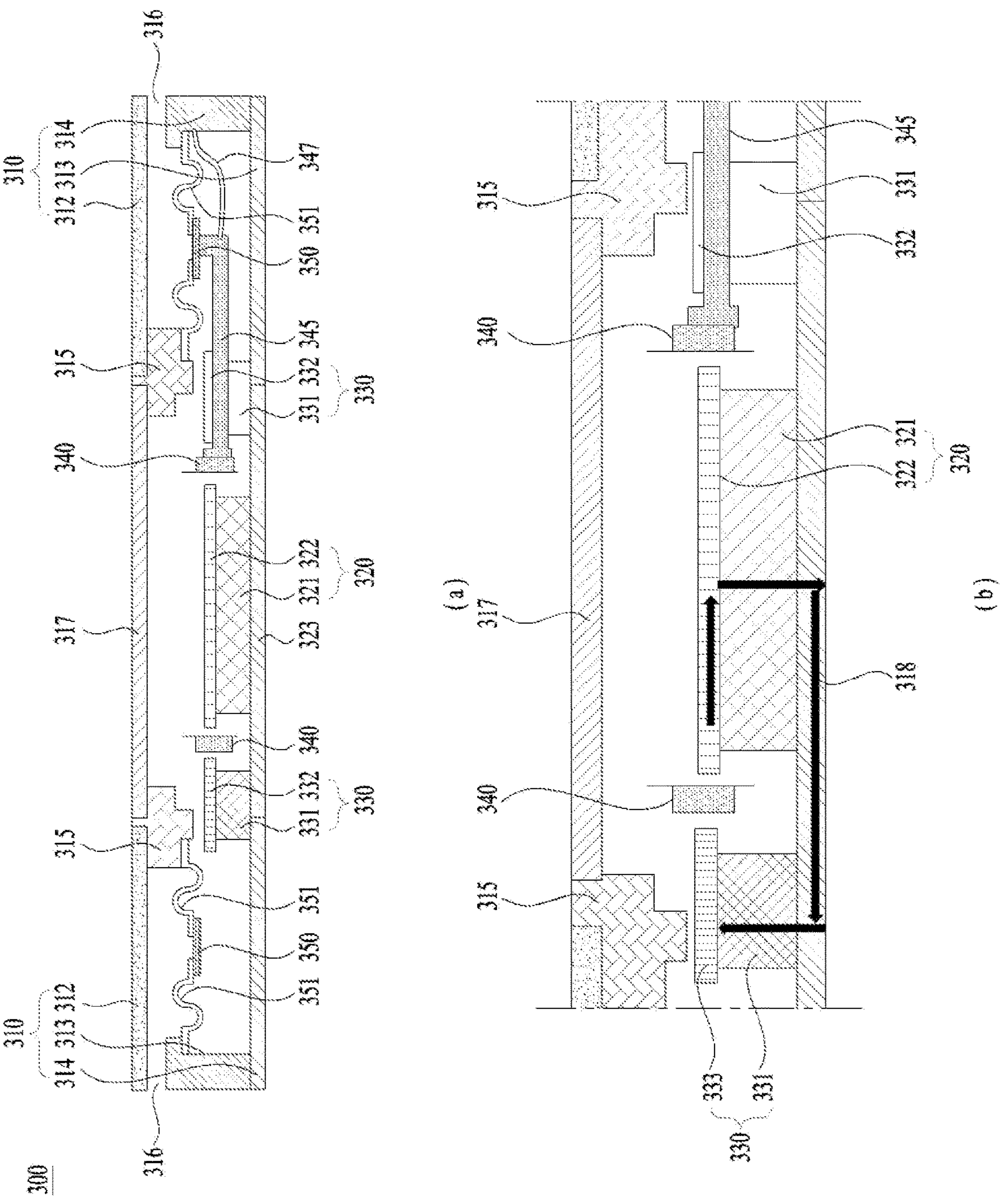
FIGS. 8 to 10 are sectional views showing the sound output equipment according to the present disclosure.

When the diaphragm 350 and the voice coil 340 are disposed in a vertical direction, as shown in FIG. 5, the thickness of the sound output equipment 300 is increased. In the present disclosure, the diaphragm 350 is not disposed above the voice coil 340 but is level with the voice coil 340. As shown in FIG. 8, the diaphragm 350 may be located around the outer circumference of the outer magnetic portion 330, and the diaphragm 350 and the voice coil 340 may be connected to each other via the bridge 345.

The bridge 345 may be disposed in gaps between a plurality of outer magnetic portions 330 to transmit vibration of the voice coil 340 to the diaphragm 350. The damper 347, which fixes the position of the voice coil 340, may be connected to the frame 310 via the bridge 345.

The damper 347 may be made of a metal material so as to have elasticity, and may be configured to have a net shape, not a straight structure for direct connection between the frame 310 and the bridge 345, such that the shape of the damper is changed in response to the amplitude of the diaphragm 350 and the voice coil 340 to prevent direct contact between the voice coil 340 and the frame 310 while not disturbing vibration of the voice coil 340 and the diaphragm 350.

In this embodiment, vibration of the voice coil 340 is not directly transmitted to the diaphragm 350 in the vertical direction but is indirectly transmitted to the diaphragm 350 via the bridge 345, and therefore greater driving force is necessary. In order to reinforce driving force, intensity of a magnetic field may be increased, or the inner magnetic portion 320 may be provided to reinforce the intensity of a magnetic field instead of the pole located inside the voice coil 340.

The base plate 318 includes a metal material, and gathers magnetic force to form the flow of magnetic force. The base plate is also referred to as a yoke, and both the outer magnetic portion 330 and the inner magnetic portion 320 are disposed in contact with the base plate 318.

The voice coil 340, which is an electromagnet configured to vibrate in a magnetic field when current flows therein, may be wound around a bobbin so as to have a predetermined height in the vertical direction. The voice coil 340 may output a sound while generating vibration in response to a signal applied thereto. The voice coil 340 is located between the outer magnetic portion 330 and the inner magnetic portion 320, and is located in a magnetic field formed by the outer magnetic portion 330 and the inner magnetic portion 320.

The shape of each of the inner magnetic portion and the outer magnetic portion may be changed depending on the shape of the sound output equipment 300. As shown in FIG. 7, the circular sound output equipment 300 may include a circular inner magnetic portion 320 and a ring-shaped outer magnetic portion 330.

The outer magnetic portion 330 may be divided into a plurality of parts, and the plurality of divided outer magnetic portions 330 may be disposed outside the voice coil 340 in a circle. As shown in FIG. 7, the outer magnetic portion may be divided into three or four parts. The bridge 345 may be located in gaps between the plurality of outer magnetic portions 330.

Since the sound output equipment 300 according to this embodiment is circular, the shape of each outer magnetic portion 330 is curved. For rectangular sound output equipment 300, however, each outer magnetic portion 330 may be straight when the outer magnetic portions 330 are located at sides and corner portions are omitted. Preferably, the plurality of outer magnetic portions 330 has the same size. When having the same size, it is possible to form a symmetric magnetic field.

Figure 9:
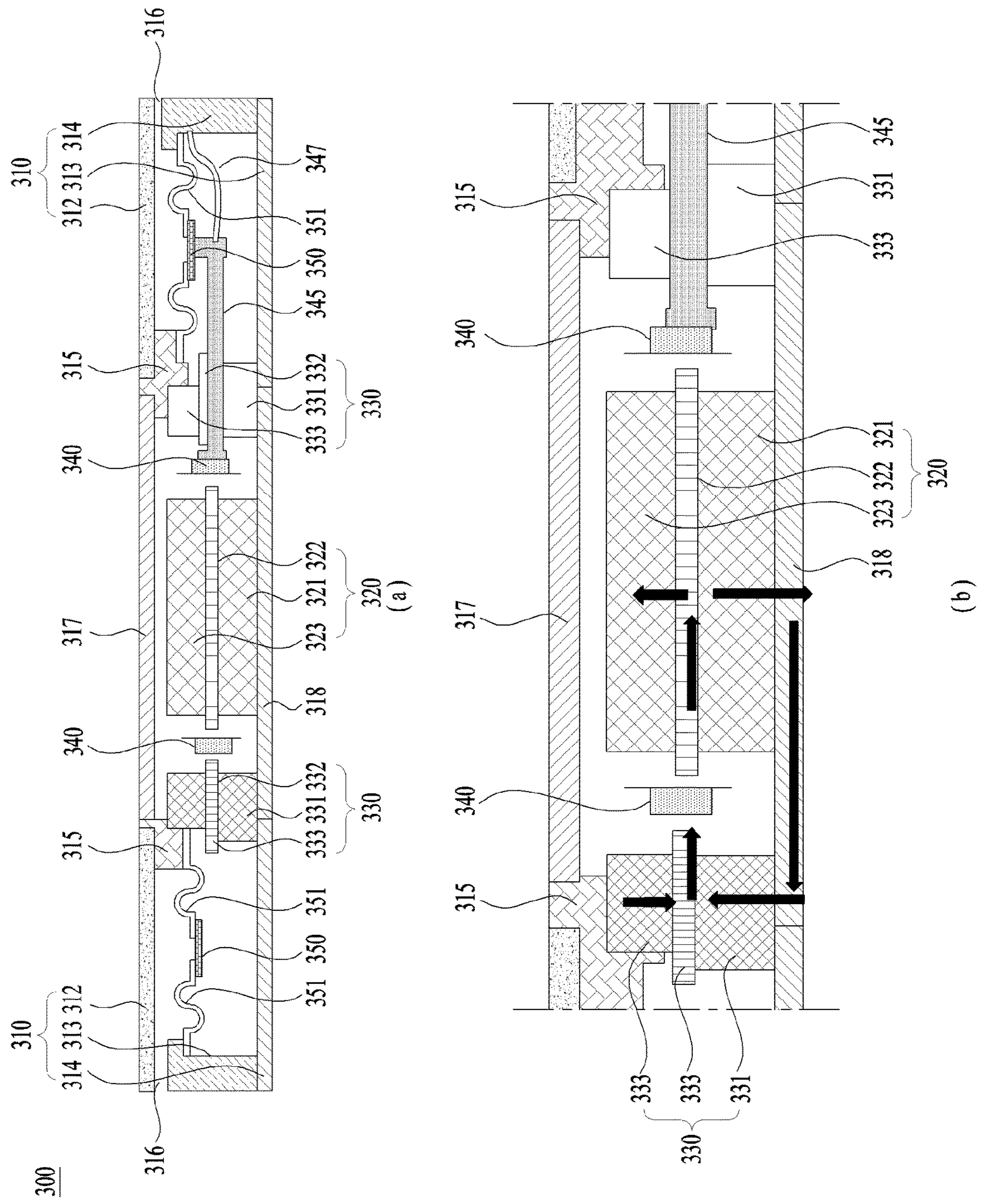
Figure 10:
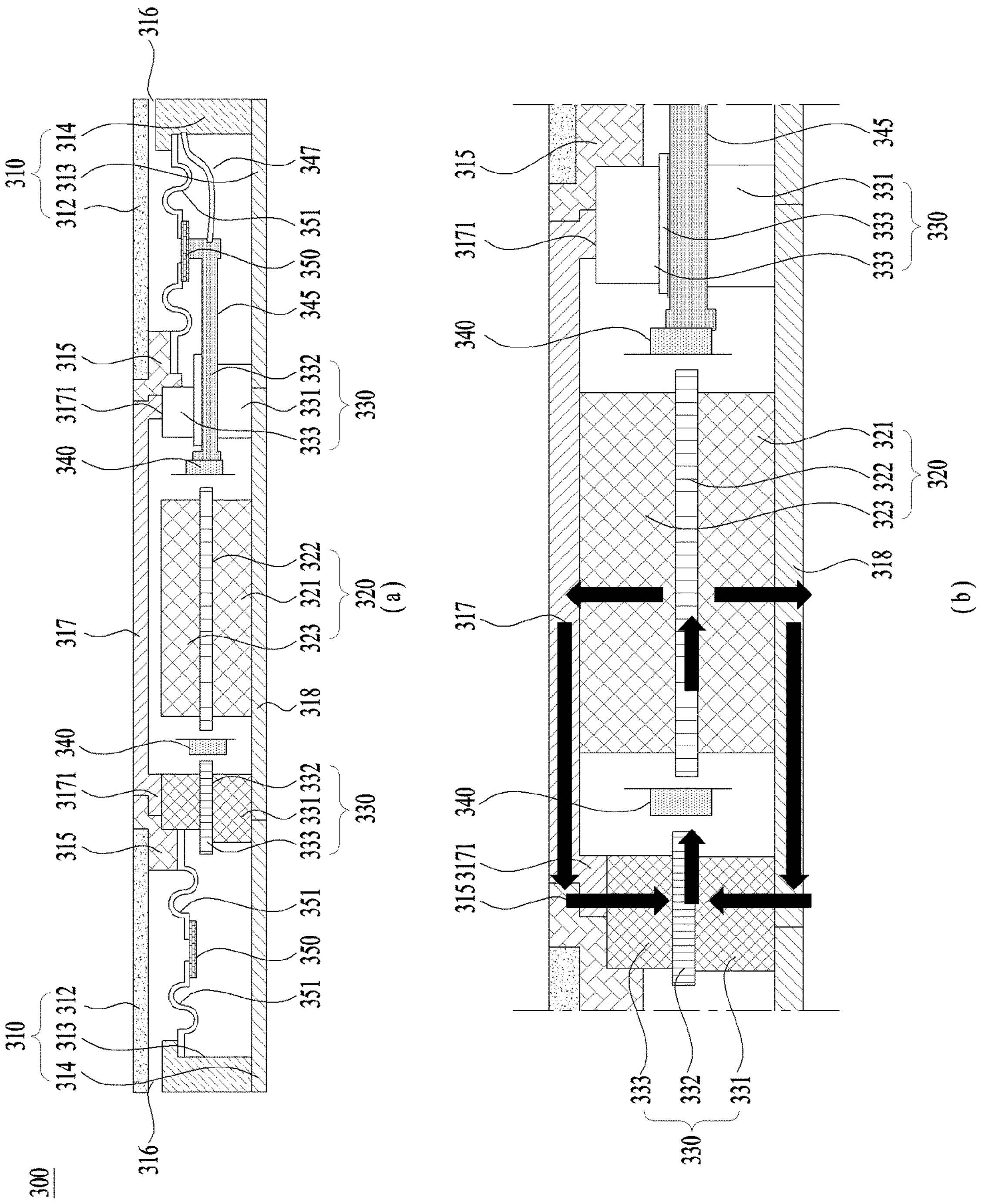

FIGS. 8 to 10 are sectional views showing the sound output equipment 300 according to the present disclosure. Embodiments are different from each other in construction of the inner magnetic portion 320 and the outer magnetic portion 330, and are similar to each other in disposition of the frame 310, the diaphragm 350, the bridge 345, and the voice coil 340. Depending on embodiments, the configuration of the magnetic field formed by the inner magnetic portion 320 and the outer magnetic portion 330 may be changed.

The frame 310, which wraps the part at which the voice coil 340 is located, may include an upper frame 312, a side frame 313, and a lower frame 314, and the part at which the magnetic portion configured to form the magnetic field is located may include a base plate 318 including a metal material and an upper cover 317.

The lower frame 314 and the base plate 318 may be integrally formed using a metal material. In this embodiment, however, space outside the outer magnetic portion 330 is large, whereby the magnetic field may be dispersed. Consequently, a base plate 318 made of a metal material may be located up to a position corresponding to the outer magnetic portion 330, whereas a lower frame 314 formed by injection molding may have a ring shape so as to be disposed around the base plate 318.

One edge 351 of the diaphragm 350 may be fixed to the side frame 313, which is located around the lower frame 314 and covers the side surface of the sound output equipment 300, and the side frame 313 may include a sound hole 316 disposed in a lateral direction.

The sound output unit 160 located at the rear surface of the display device 100 shown in FIG. 4 may be disposed such that the diaphragm is vibrated in a forward-rearward direction of the display device 100.

The lower surface of the sound output equipment 300 faces the front surface of the display device 100, and the upper surface of the sound output equipment 300 faces the rear surface of the display device 100. The sound hole 316 may not be formed in the upper surface of the frame (upper frame 312) but may be located at the side surface of the frame (side frame 313) such that a sound is output in a lateral direction of the display device 100.

In order to amplify the sound generated through vibration of the diaphragm 350, a resonance structure may be further included, and a resonance hole connected to the resonance structure (enclosure) may be located at the side surface of the frame. The upper frame 312, which covers the upper part of the diaphragm 350, may have a doughnut shape, like the lower frame 314, and may be located at the outer circumference of the upper cover 317 located above the magnetic portion.

A guide 315 located between the upper cover 317 and the upper frame 312 may be aligned in position with the upper cover 317, and the other edge 351 of the diaphragm 350 may be coupled to the guide. The diaphragm 350 may be coupled to the side frame 313 and the guide 315 through the edge 351, and may be disposed at a position surrounded by the upper frame 312, the lower frame 314, and the side frame 313.

The inner magnetic portion 320 according to the embodiment of FIG. 8(*a*) includes an inner plate 322 and a first inner magnet 321 located under the inner plate, and the outer magnetic portion 330 includes an outer plate 332 and a first outer magnet 331 located under the outer plate.

FIG. 8(*b*), which is an enlarged view of the magnetic portion 320 and the voice coil 340 according to the embodiment of FIG. 8(*a*), schematically shows the flow of a magnetic field. The plates 322 and 332 serve to gather magnetic force of the magnets and to guide the magnetic force such that a magnetic field is formed in a direction in which the magnetic force passes through the voice coil 340 (horizontal direction in the figure).

The upper and lower positions of the inner plate 322 and the outer plate 332 may be identical to each other such that the inner magnetic portion 320 and the outer magnetic portion 330 form a magnetic field through the voice coil 340. The first inner magnet 321 located under the inner plate 322 and the first outer magnet 331 located under the outer plate 332 may have the same height such that the inner plate 322 and the outer plate 332 are located at the same height.

In order to maximally receive the magnetic field formed by the outer magnetic portion 330 and the inner magnetic portion 320, the voice coil 340 may be disposed such that a plane formed by the outer plate 332 and the inner plate 322 is located at a center (see FIGS. 8 to 10).

Since magnetic force increases as the size of a magnet is increased, the thicknesses of the first inner magnet 321 and the first outer magnet 331 may be increased to reinforce insufficient magnetic force. However, if the first inner magnet 321 or the first outer magnet 331 located under the inner plate 322 or the outer plate 332 is increased, an upper space must be increased in consideration of the amplitude of the voice coil 340, whereby the thickness of the sound output equipment 300 is increased.

In order to reinforce magnetic force without increasing the thicknesses of the first inner magnet 321 and the first outer magnet 331, a second inner magnet 323 may be additionally provided on the inner plate 322, and a second outer magnet 333 may be additionally provided on the outer plate 332, as shown in FIG. 9(*a*).

Since empty space above the inner plate 322 and the outer plate 332 is utilized, it is possible to reinforce magnetic force while preventing an increase in size of the sound output equipment 300.

Referring to FIG. 9(*b*), magnetic force is reinforced by the second inner magnet 323 and the second outer magnet 333 located on the inner plate 322 and the outer plate 332, whereby it is possible to increase intensity of a magnetic field.

However, upper side surfaces of the second inner magnet 323 and the second outer magnet 333 located on the plates 322 and 332 are not connected to each other, whereby the flow of a magnetic field above the plates 322 and 332 is weak, compared to the flow of a magnetic field under the plates 322 and 332.

That is, magnetic force of the second inner magnet 323 and the second outer magnet 333, at which the magnetic force is dispersed, may not be sufficiently utilized, and therefore intensity of a magnetic field that actually affects driving of the voice coil 340 may be weakened.

The embodiment of FIG. 10 is characterized in that, in order to sufficiently utilize the magnetic force of the second inner magnet 323 and the second outer magnet 333, the second inner magnet 323 and the second outer magnet 333 are disposed in contact with the upper cover 317 such that the flow of a magnetic field is continuously formed.

Since the second inner magnet 323 is located immediately under the upper cover 317 and the second outer magnet 333 is located on the guide 315, a protrusion 3171 protruding from an end of the upper cover 317 toward the second outer magnet 333 may be further included, as shown in FIG. 10(*a*).

Alternatively, the thickness of the second outer magnet 333 may be increased such that the second outer magnet is brought into contact with the upper cover 317. Since the edge 351 of the diaphragm 350 is coupled to the guide 315, however, it is difficult to omit the guide 315 or to change the position of the guide 315 outwards. Consequently, the end 3171 of the upper cover 317 may be bent so as to contact the second outer magnet 333, as previously described.

The second inner magnet 323 may have a height by which the space above the inner plate 322 is filled with the second inner magnet 323. In order to minimize the thickness of the sound output equipment 300, compared to the amplitude of vibration of the voice coil 340, the first inner magnet 321 and the second inner magnet 323 may have the same thickness so as to have a symmetrical structure in a vertical direction based on the inner plate 322.

The second outer magnet 333 may also have the same thickness as the first outer magnet 331. However, the second outer magnet 333 may have a thickness less than the thickness of the first outer magnet 331 in consideration of the position of the guide 315.

Referring to FIG. 10(*b*), the second inner magnet 323 and the second outer magnet 333 may be connected to each other via the upper cover 317, which is made of a metal material, whereby a continuous magnetic flow may be formed through the upper cover 317. Consequently, magnetic force of the second inner magnet 323 and the second outer magnet 333 may be sufficiently reflected in the overall flow of a magnetic field, and a continuous flow of a magnetic field may be formed, as shown in FIG. 10.

In the embodiment of FIG. 9, the magnetic force applied to the voice coil 340 is about 1.64 Tm. In the embodiment of FIG. 10, however, the magnetic force is 2.12 Tm, and therefore the magnetic force may be increased by about 0.48 Tm (about 30%).

In addition, the magnetic field flows symmetrically in the vertical direction, and therefore a change in intensity of the magnetic field may be reduced even though the voice coil 340 is moved in the vertical direction. The voice coil 340 may be more stably vibrated, whereby a sound improvement effect is achieved, and the magnitude of power applied to the voice coil 340 for the same output may be reduced, whereby an efficiency improvement effect is achieved.

In addition, the space between the upper cover 317 and the second inner magnet 323 may be omitted, compared to the embodiment of FIG. 9, whereby the sound output equipment 300 according to the embodiment of FIG. 10 may be implemented so as to have a smaller thickness, thus having a slimmer structure.

Figure 11:
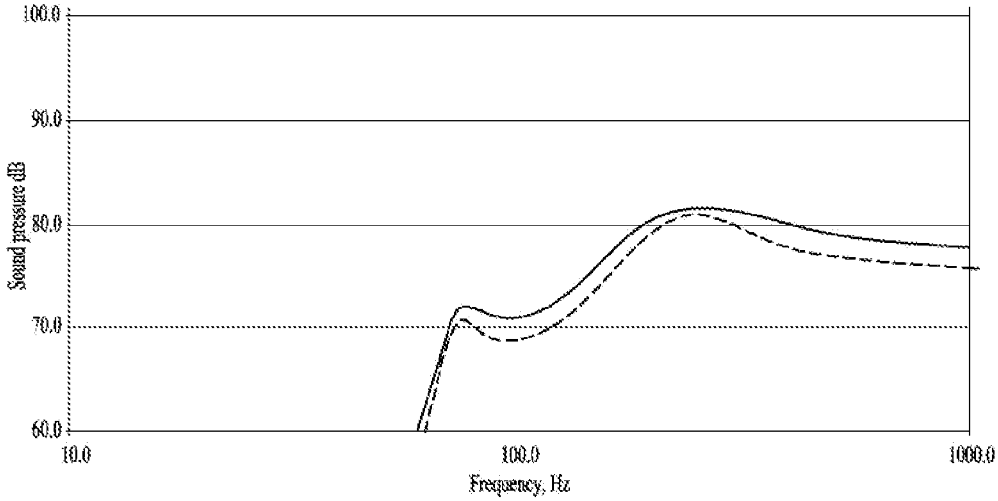
FIG. 11 is a graph showing sound pressure of the sound output equipment according to the present disclosure depending on frequency.

FIG. 11 is a graph showing sound pressure of the sound output equipment 300 according to the present disclosure depending on frequency. The solid line indicates sound pressure of the sound output equipment 300 according to the embodiment of FIG. 10, and the dotted line indicates sound pressure of the sound output equipment 300 according to the embodiment of FIG. 9. It can be seen that, when the resonance structures have the same size, performance is improved by about 2 dB based on bass.

As described above, the sound output equipment 300 according to the present disclosure exhibits excellent output efficiency while having a slim structure.

In addition, since the sound output equipment 300 has a slim structure, it is possible to reduce the thickness of a display device including the same.

As is apparent from the foregoing description, the present disclosure may provide sound output equipment that exhibits excellent output efficiency while having a slim structure.

Effects obtainable from the present disclosure are not limited by the above mentioned effects, and other unmentioned effects can be clearly understood from the above description by those having ordinary skill in the technical field to which the present disclosure pertains.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. Sound output equipment comprising:
a base plate comprised of a metal material;
an inner magnetic portion located at a center of the base plate;
a voice coil located around an outer circumference of the inner magnetic portion;
a plurality of outer magnetic portions located along an outer circumference of the voice coil;
an upper cover located above the inner magnetic portion, the voice coil, and the plurality of outer magnetic portions;
a circular diaphragm having a doughnut shape located around an outer circumference of the plurality of outer magnetic portions;
a frame located around and above the diaphragm;
a guide located between the frame and the upper cover; and
a bridge horizontally extending from the voice coil to pass between the plurality of outer magnetic portions, and connected to the circular diaphragm to the voice coil,
wherein the diaphragm comprises an outer edge connected to the frame and an inner edge connected to the guide.

2. The sound output equipment according to claim 1,
wherein the inner magnetic portion comprises:
a first inner magnet
an inner plate located at an upper surface of the first inner magnet; and
a second inner magnet located at an upper surface of the inner plate, and
wherein the outer magnetic portion comprises:
a plurality of first outer magnets located at an outer circumference of the voice coil;
an outer plate located at upper surfaces of the first outer magnets; and
a second outer magnet located at an upper surface of the outer plate, and
wherein the upper cover comprises a metal material and is in contact with the upper surface of the second inner magnet and the upper surface of the second outer magnet.

3. The sound output equipment according to claim 2, wherein the upper cover further comprises an edge portion protruding toward the second outer magnet.

4. The sound output equipment according to claim 2, wherein the voice coil comprises a center of the voice coil and a center of the inner plate are both orientated in a vertical direction such that the center of the voice coil and the center of the inner plate are located in a same plane.

5. The sound output equipment according to claim 4, wherein the second inner magnet comprises a thickness corresponding to a same thickness of the first inner magnet.

6. The sound output equipment according to claim 1, further comprising:
a resonance hole located in a lateral direction of the frame; and
an enclosure communicating with the resonance hole, wherein the enclosure is configured to form a resonance space.

7. The sound output equipment according to claim 1, further comprising a damper configured to connect the bridge to the frame, wherein the damper is elastic.

8. The sound output equipment according to claim 1, wherein the bridge is located in gaps between the plurality of outer magnetic portions.

9. A display device comprising:
a housing;
a display module located at a front side of the housing; and
a slim speaker located in a rear direction of the display module, wherein the slim speaker comprises:
a base plate made of a metal material;
an inner magnetic portion located at a center of the base plate;
a voice coil located around an outer circumference of the inner magnetic portion;
a plurality of outer magnetic portions located along an outer circumference of the voice coil;
an upper cover located above the inner magnetic portion, the voice coil, and the plurality of outer magnetic portions;
a circular diaphragm having a doughnut shape located around an outer circumference of the plurality of outer magnetic portions; and
a frame located around and above the diaphragm;
a guide located between the frame and the upper cover; and
a bridge horizontally extending from the voice coil to pass between the plurality of outer magnetic portions, and connected to connect the diaphragm,
wherein the diaphragm comprises an outer edge connected to the frame and an inner edge connected to the guide.

10. The display device according to claim 9,
wherein the inner magnetic portion comprises:
a first inner magnet;
an inner plate located at an upper surface of the first inner magnet; and
a second inner magnet located at an upper surface of the inner plate, and the outer magnetic portion comprises:

a plurality of first outer magnets located at an outer circumference of the voice coil;

an outer plate located at upper surfaces of the first outer magnets; and a second outer magnet located at an upper surface of the outer plate, and wherein the upper cover comprises a metal material, and contacts upper surfaces of the second inner magnet and the second outer magnet.

* * * * *